US008725436B2

(12) United States Patent
Yamada et al.

(10) Patent No.: US 8,725,436 B2
(45) Date of Patent: May 13, 2014

(54) MOTION STATE DETECTING METHOD AND MOTION STATE DETECTING APPARATUS

(75) Inventors: Hideaki Yamada, Shimosuwa-machi (JP); Michihiro Nagaishi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 468 days.

(21) Appl. No.: 13/023,450

(22) Filed: Feb. 8, 2011

(65) Prior Publication Data

US 2011/0196626 A1 Aug. 11, 2011

(30) Foreign Application Priority Data

Feb. 9, 2010 (JP) ................................. 2010-026257

(51) Int. Cl.
*G01R 15/00* (2006.01)
*G01R 27/00* (2006.01)
(52) U.S. Cl.
USPC ............................................. 702/57; 702/65
(58) Field of Classification Search
USPC ..................................................... 702/57, 65
See application file for complete search history.

(56) References Cited

U.S. PATENT DOCUMENTS

| | | | | |
|---|---|---|---|---|
| 3,742,767 A * | 7/1973 | Bernard et al. | ............ | 73/514.18 |
| 4,150,568 A * | 4/1979 | Berger et al. | ............ | 73/152.47 |
| 5,796,869 A * | 8/1998 | Tsuji et al. | ..................... | 382/203 |
| 5,965,855 A * | 10/1999 | Tanazawa et al. | .... | 200/61.45 M |
| 6,612,157 B2 * | 9/2003 | Urano et al. | .................. | 73/65.01 |
| 2005/0104853 A1 * | 5/2005 | Sitalasai et al. | ............... | 345/163 |
| 2008/0309627 A1 * | 12/2008 | Hotelling et al. | ............. | 345/173 |
| 2011/0018554 A1 * | 1/2011 | Yamada et al. | ............... | 324/649 |
| 2011/0202304 A1 * | 8/2011 | Yamada et al. | ............... | 702/141 |
| 2012/0154365 A1 * | 6/2012 | Yamauchi | ..................... | 345/211 |

FOREIGN PATENT DOCUMENTS

JP 11-118587 A 4/1999

* cited by examiner

*Primary Examiner* — Michael Nghiem
(74) *Attorney, Agent, or Firm* — Kilpatrick Townsend & Stockton LLP

(57) ABSTRACT

A motion state detecting method using a detector, detecting one of a conducting state and a non-conducting state according to a movement of an object, includes: first processing to measure either a first number of times, indicating the number of times of change from the conducting state to the non-conducting state per unit time or a second number of times that is the number of times of change from the non-conducting state to the conducting state per the unit time; and second processing to regard either the first number of times or the second number of times as a change determination value and change a length of the unit time based on the change determination value; wherein a proportion of time of the conducting state per the unit time or the non-conducting state per the unit time is changed by changing the length of the unit time.

4 Claims, 8 Drawing Sheets

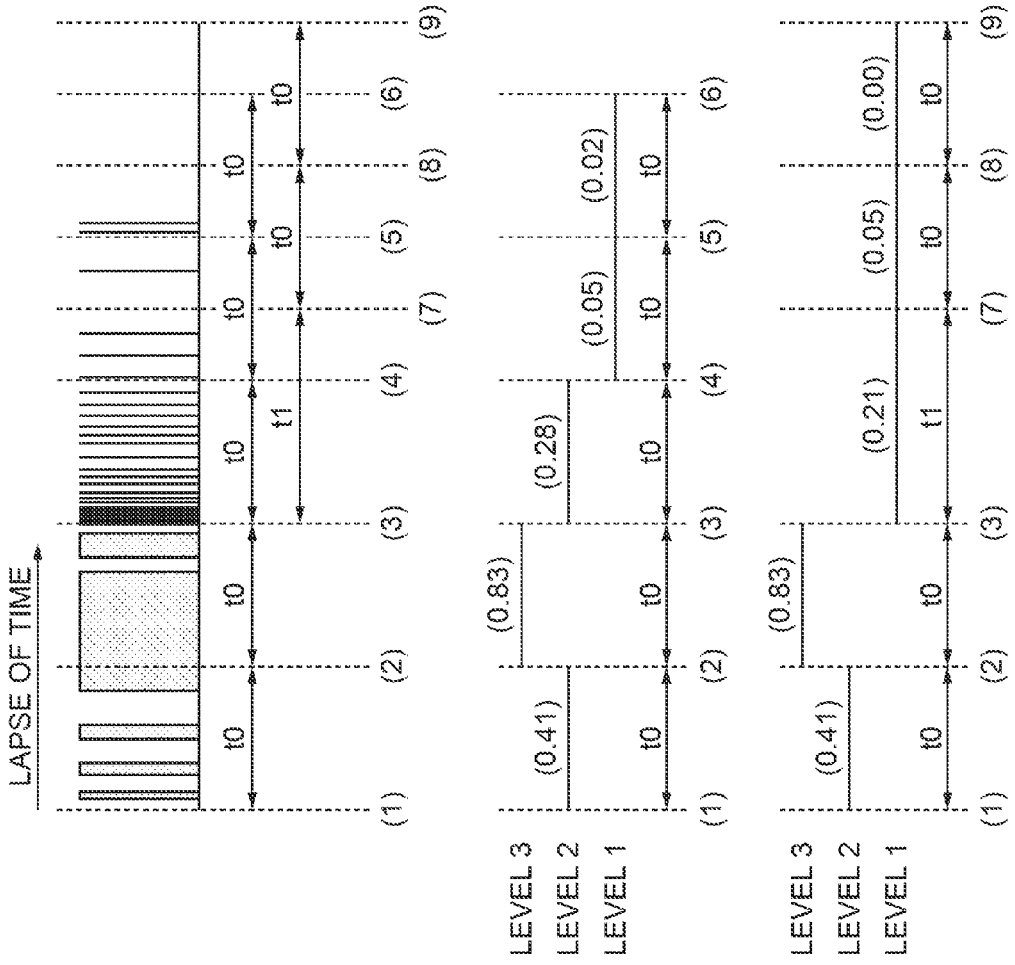

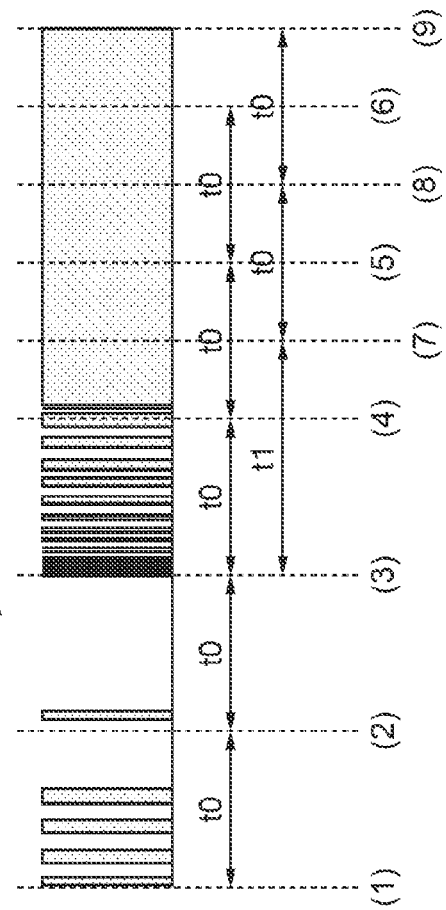
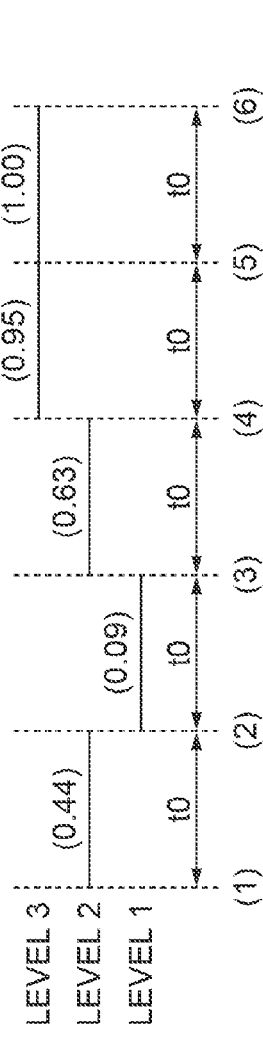
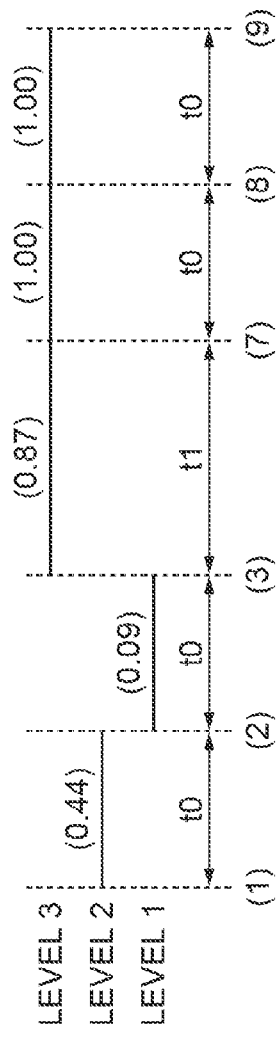
FIG. 7A
FIG. 7B
FIG. 7C

MOTION STATE DETECTING METHOD AND MOTION STATE DETECTING APPARATUS

BACKGROUND

1. Technical Field

The present invention relates to a motion state detecting method and a motion state detecting apparatus used to grasp the motion state of, for example, a person or the like.

2. Related Art

Traditionally, the motion or so-called motion state of objects including animals such as humans is detected and the result of the detection is used for observation or control of machines. The machines used for this control range broadly from automobiles, aircraft and ships to industrial robots. Generally, an acceleration sensor or an angular velocity sensor is often used to detect the motion state. This is because detection accuracy is required for the use for the control of machines. Therefore, since power is continuously supplied in the environment of use, the issue of power consumption by the sensor itself tends to have a low priority.

Moreover, there traditionally is a sensor called ball sensor in which a conducting sphere is arranged that is movable in a space surrounded by plural electrodes. Since the conducting sphere is located in a gravitational direction within the space, the way the conducting sphere contacts the plural electrodes varies depending on the tilt and movement of an object to which the ball sensor is attached. Thus, a conducting state or a non-conducting state is created between each of the plural electrodes. Therefore, the tilt and movement of the object to which the ball sensor is attached can be detected by measuring the conducting state or the non-conducting state between the plural electrodes. The power consumption by the ball sensor is small because the ball sensor consumes power in the conducting state. However, since the detection accuracy is decided based on the size of the conducting sphere and the shape of each of the plural electrodes, the ball sensor has a lower detection accuracy than the acceleration sensor or the angular velocity sensor.

Although the detection accuracy and the power consumption may conflict with each other as described above, there is a sensor device having a combination of a sensor unit with a high detection accuracy and large power consumption and a sensor unit with a low detection accuracy and small power consumption, as a method to cope with the conflict . For example, JP-A-11-118587 proposes a technique of realizing an oscillation detecting apparatus in which a conducting sphere is placed in a space surrounded by three electrodes that are insulated from each other and the conducting sphere moves because of oscillation or the like and contacts different ones of the electrodes and thus starts up an electrical oscillation detection unit, so that power consumption is smaller than in the case of constantly keeping the electrical oscillation detection unit started up.

However, in JP-A-11-118587, while the fact that the electrical oscillation detection unit is not started up unless the movement of the conducting sphere and the change in the conducting state between the electrodes occur leads to power-saving, measurement is carried out by the electrical oscillation detection unit and power-saving is not realized at the time of measurement. There is also a problem that oscillation cannot be measured before the electrical oscillation detection unit is started up.

SUMMARY

An advantage of some aspects of the invention is to solve at least a part of the problems described above and the invention can be implemented as a motion state detecting method and a motion state detecting apparatus in the following forms or application examples.

APPLICATION EXAMPLE 1

According to this application example, a motion state detecting method using a detector which detects one of a conducting state and a non-conducting state according to a movement of an object, includes: first processing to measure either a first number of times that is the number of times of change from the conducting state to the non-conducting state per unit time or a second number of times that is the number of times of change from the non-conducting state to the conducting state per the unit time; and second processing to regard either the first number of times or the second number of times as a change determination value and change a length of the unit time based on the change determination value; wherein a proportion of time of the conducting state per the unit time or a proportion of time of the non-conducting state per the unit time is changed by changing the length of the unit time.

With this method, either the first number of times that is the number of times of change from the conducting state to the non-conducting state or the second number of times that is the number of times of change from the non-conducting state to the conducting state is measured. Using either the first number of times or the second number of times as the change determination value, the length of the unit time is changed. Thus, the proportion of the time of the conducting state per the unit time or the proportion of the time of the non-conducting state per the unit time can be changed. The motion state of the object to which the detector is attached can be detected more appropriately.

As a detector which detects the conducting state or the non-conducting state, there is a detector called ball sensor having a first electrode, a second electrode and a spherical conductor movable between the first electrode and the second electrode. In the case of such a detector, the conducting state or the non-conducting state between the first electrode and the second electrode is decided based on the moving state of the spherical conductor. However, it may be impossible to discriminate whether the target object stands still or not, depending on the motion state of the target object. For example, when detector is violently tiled, a case may occur where the spherical conductor sticks to either the first electrode or the second electrode. The output of the detector in this case is the same as the output of the detector where the spherical conductor stands still in contact with either the first electrode or the second electrode.

However, when the detector moves violently and then stops in this manner, the conductor moving between the first electrode and the second electrode cannot be stopped immediately and continues moving violently between the first electrode and the second electrode for a while. During this time, the conducting state and the non-conducting state between the first electrode and the second electrode are switched considerably. That is, when there is a period during which the output of the detector is switched considerably between the conducting state and the non-conducting state, the conducting state or the non-conducting state immediately before can be determined as indicating that the detector is in the motion state. In this case, either the first number of times or the second number of times which reflects the moving state of the spherical conductor is regarded as the change determination value, and the length of the unit time is changed based on the change determination value as a determination standard. The proportion of the time when the conducting state is provided per the unit time or the proportion of the time of the non-conducting state per the unit time is changed. Thus, it is possible to detect the motion state which is closer to the actual movement, using the proportion of the time of the conducting state per the unit time or the proportion of the time of the non-conducting state per the unit time.

APPLICATION EXAMPLE 2

In the motion state detecting method according to the above application example, it is preferable that in the second processing, the change determination value is compared with a first reference value, and if the change determination value exceeds the first reference value, the length of the unit time is increased.

With this method, as the length of the unit time is changed if the change determination value exceeds the first reference value, the processing to detect the motion state can be simplified. If the change determination value is equal to or smaller than the first reference value, the level of the motion state may not change even if the length of the unit time is changed, though the change in the level depends on the way of setting the levels of the motion state. In such case, since no processing to change the length of the unit time is necessary, the processing can be simplified by this amount. The way of setting the levels of the motion state and the first reference value are considered to vary depending on the target object to be detected. Therefore, the way of setting the levels of the motion state and the first reference value can be defined through experiments conducted in advance.

APPLICATION EXAMPLE 3

In the motion state detecting method according to the above application example, it is preferable that the second processing is carried out if the proportion of the time of the conducting state per the unit time is smaller than a first boundary condition value and greater than a second boundary condition value that is smaller than the first boundary condition value.

With this method, since the length of the unit time is changed if the proportion of the conducting state per the unit time or the proportion of the non-conducting state per the unit time is smaller than the first boundary condition and greater than the second boundary condition, the processing to detect the motion state can be simplified. If the proportion of the conducting state per the unit time is equal to or greater than a predetermined value, or equal to or smaller than another predetermined value, the level of the motion state may not change even if the length of the unit time is changed. Therefore, by defining the first boundary condition as a predetermined value and the second boundary condition as another predetermined value through experiments in advance, it is possible to set cases where the length of the unit time need not be changed. Accordingly, the burden of the processing needed for detecting the level of the motion state can be reduced.

APPLICATION EXAMPLE 4

According to this application example, a motion state detecting apparatus includes: a first electrode; a second electrode arranged facing the first electrode; a conductor which exists between the first electrode and the second electrode and causes the first electrode and the second electrode to enter either a conducting state or a non-conducting state; and an arithmetic processing unit; wherein the arithmetic processing unit calculates either a first number of times that is the number of times of change from the conducting state to the non-conducting state per unit time or a second number of times that is the number of times of change from the non-conducting state to the conducting state per the unit time, as a change determination value, changes a length of the unit time based on the change determination value, and changes a proportion of time of the conducting state per the unit time or a proportion of time of the non-conducting state per the unit time by changing the length of the unit time.

With this configuration, either the first number of times that is the number of times of change from the conducting state to the non-conducting state or the second number of times that is the number of times of change from the non-conducting state to the conducting state is measured. Using either the first number of times or the second number of times as the change determination value, the length of the unit time is changed. Thus, the proportion of the time of the conducting state per the unit time or the proportion of the time of the non-conducting state per the unit time can be changed. Thus, it is possible to detect the motion state which is closer to the actual movement, using the proportion of the time of the conducting state per the unit time or the proportion of the time of the non-conducting state per the unit time.

BRIEF DESCRIPTION OF THE DRAWINGS

The invention will be described with reference to the accompanying drawings, wherein like numbers reference like elements.

FIG. 6A to FIG. 6C show changes in level value in Example 1.

FIG. 7A to FIG. 7C show changes in level value in Example 2.

DESCRIPTION OF EXEMPLARY EMBODIMENTS

Hereinafter, embodiments of the invention will be described with reference to the drawings.

Figure 1:
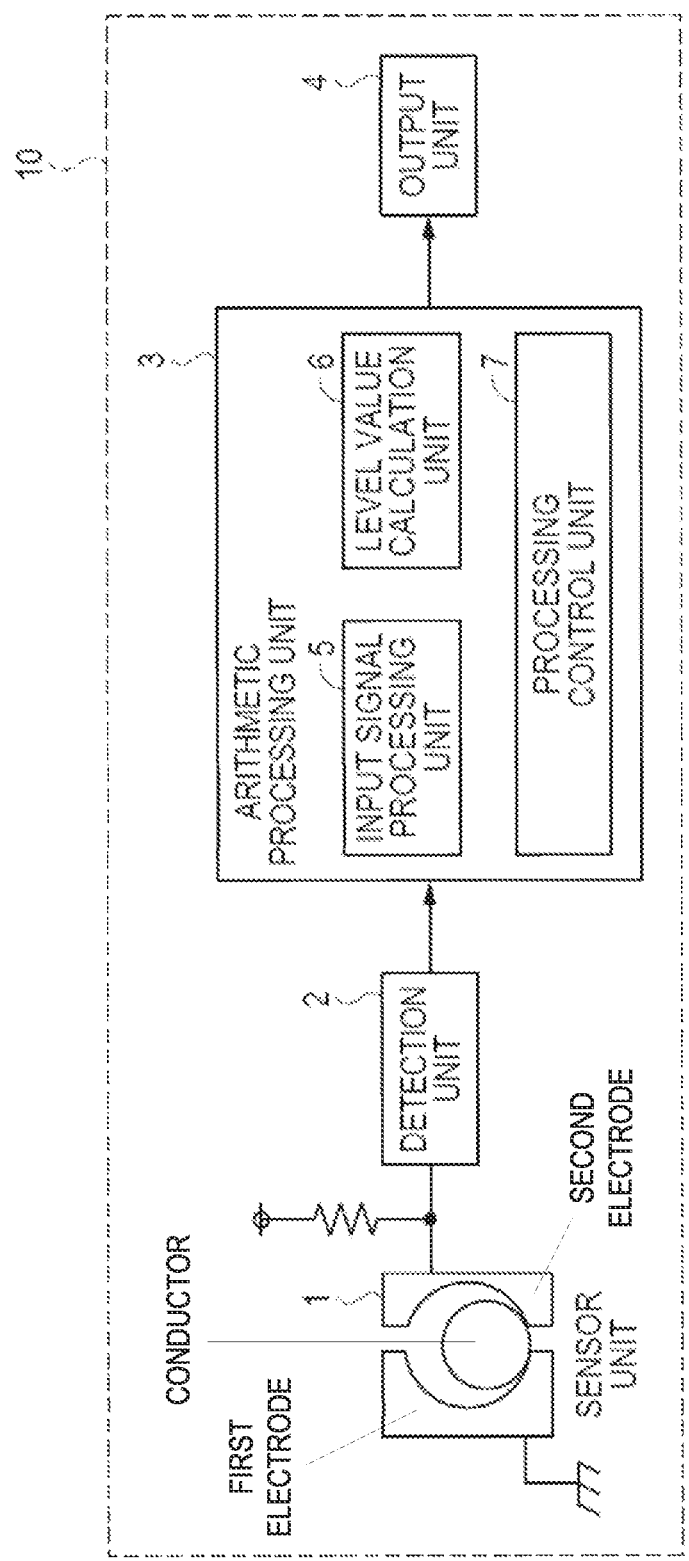
FIG. 1 shows an exemplary block diagram according to a first embodiment and a second embodiment.

FIG. 1 shows some of the components of a motion state detecting apparatus 10. The motion state detecting apparatus 10 determines which one of plural levels the motion state of a sensor unit 1 at specific time intervals is at, and outputs the value of the level acquired as the result of the determination.

The components of the motion state detecting apparatus 10 shown in FIG. 1 are the sensor unit 1, a detection unit 2 which detects an output signal from the sensor unit 1, an arithmetic processing unit 3 which processes an output signal from the detection unit 2 (hereinafter referred to as detection signal) and determines which level the motion state of the sensor unit 1 is at, and an output unit 4 which outputs the result of the determination by the arithmetic processing unit 3.

The arithmetic processing unit 3 includes an input signal processing unit 5, a level value calculation unit 6, and a processing control unit 7. The motion state detecting apparatus 10 shown in FIG. 1 may be housed in one package or may be installed divisionally in plural packages. The form of the components of the motion state detecting apparatus 10 shown in FIG. 1 is the same in all the following embodiments. Moreover, hereinafter, the conducting state of a pair of electrodes in the sensor unit 1 may be referred to as ON, and the non-conducting state may be referred to as OFF. For example, if there is a description that "the sensor unit 1 is ON", this description means that the pair of electrodes in the sensor unit 1 is in the conducting state.

First Embodiment

In this embodiment, the motion state per unit time of the sensor unit 1 determined on the basis of an output signal from the sensor unit 1 is corrected by changing the length of the unit time. The number of times the sensor unit 1 shifts from OFF to ON is used to determine whether to change the length of the unit time or not. The change between ON and OFF of the sensor unit 1 is transmitted to the arithmetic processing unit 3 as a detection signal. However, inside the arithmetic processing unit 3, this detection signal is recognized as a change in an interrupt signal and the number of times of changes is counted in the interruption processing.

The number of times, serving as the standard by which to determine whether to change the length of the unit time or not, is expressed as a determination standard S0. In this embodiment, the length of the unit time before change is expressed by t0 and the length of the unit time after change is expressed by t1.

Figure 2:
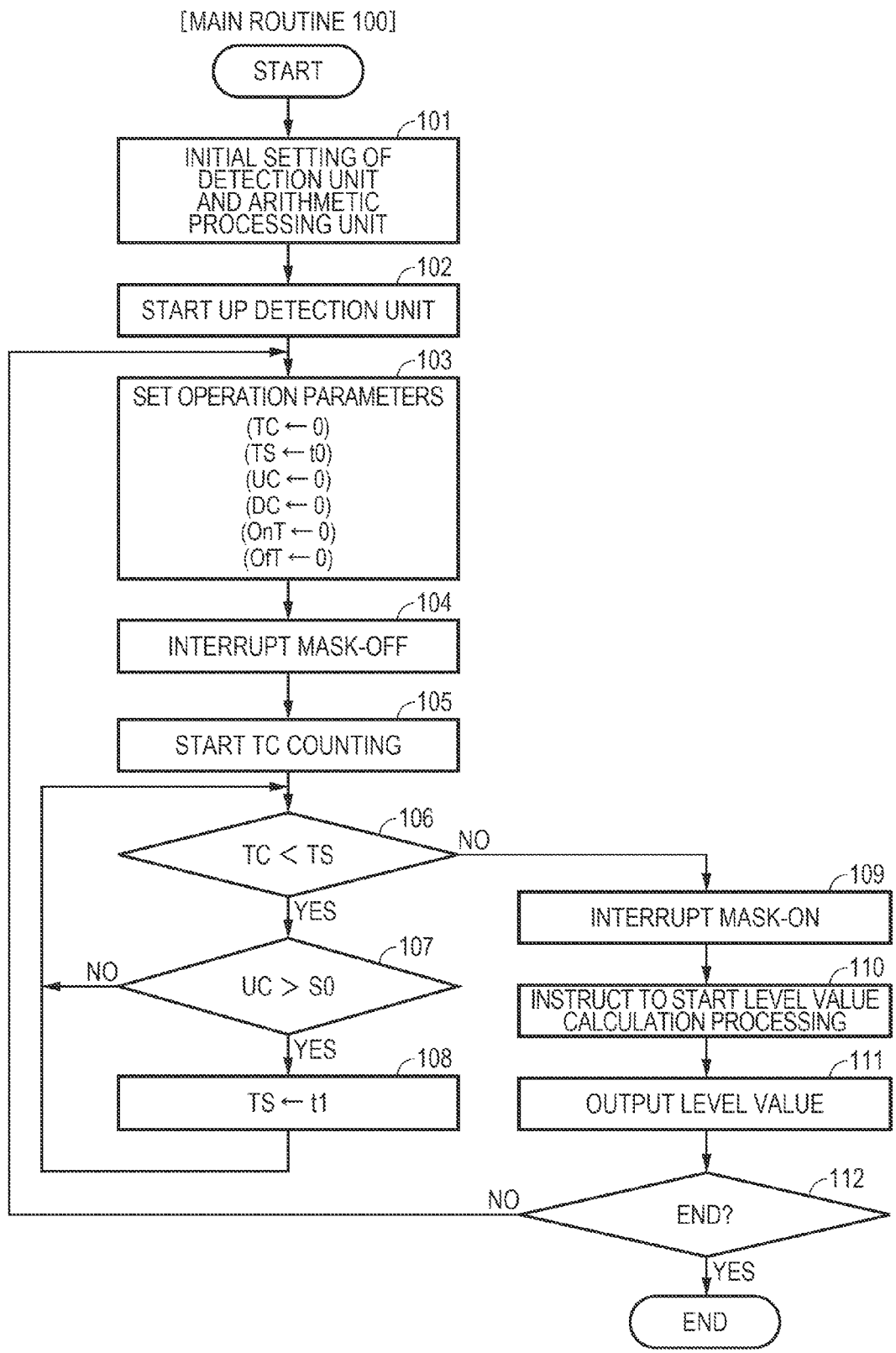
FIG. 2 shows an exemplary main flowchart according to the first embodiment.
Figure 4:
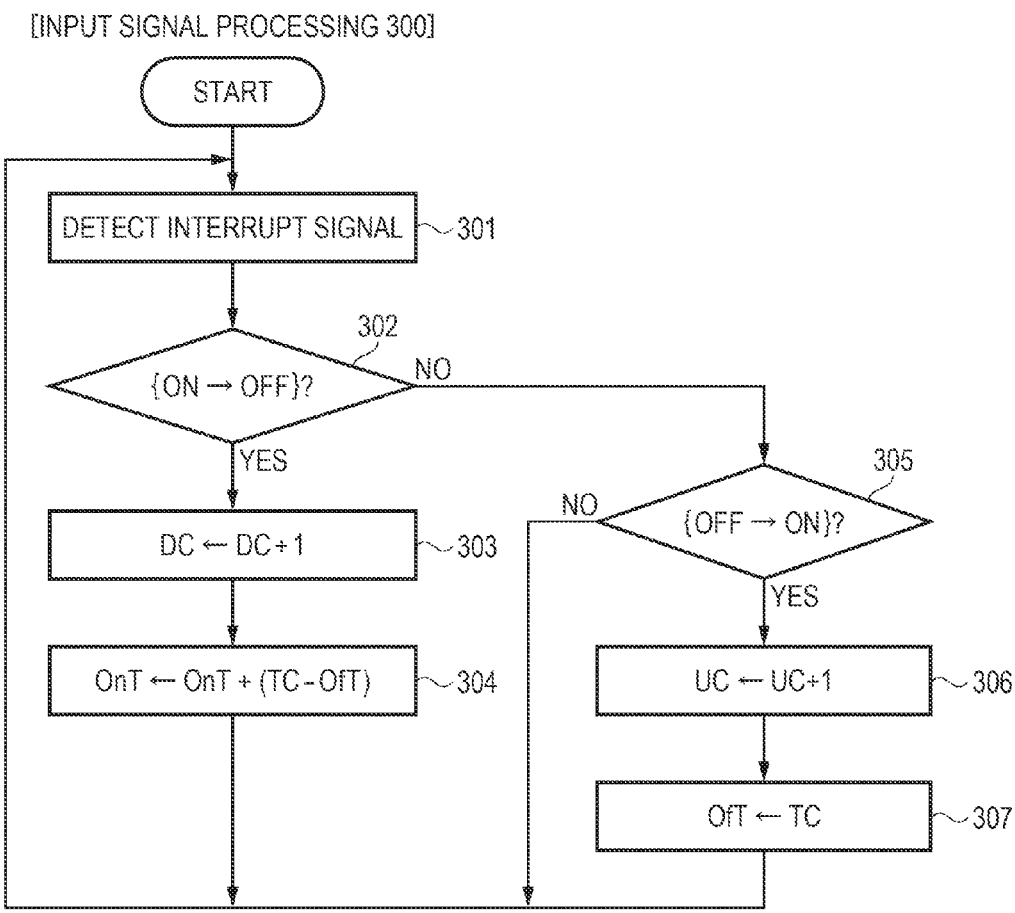
FIG. 4 shows an exemplary flowchart of signal processing in the first embodiment and the second embodiment.
Figure 5:
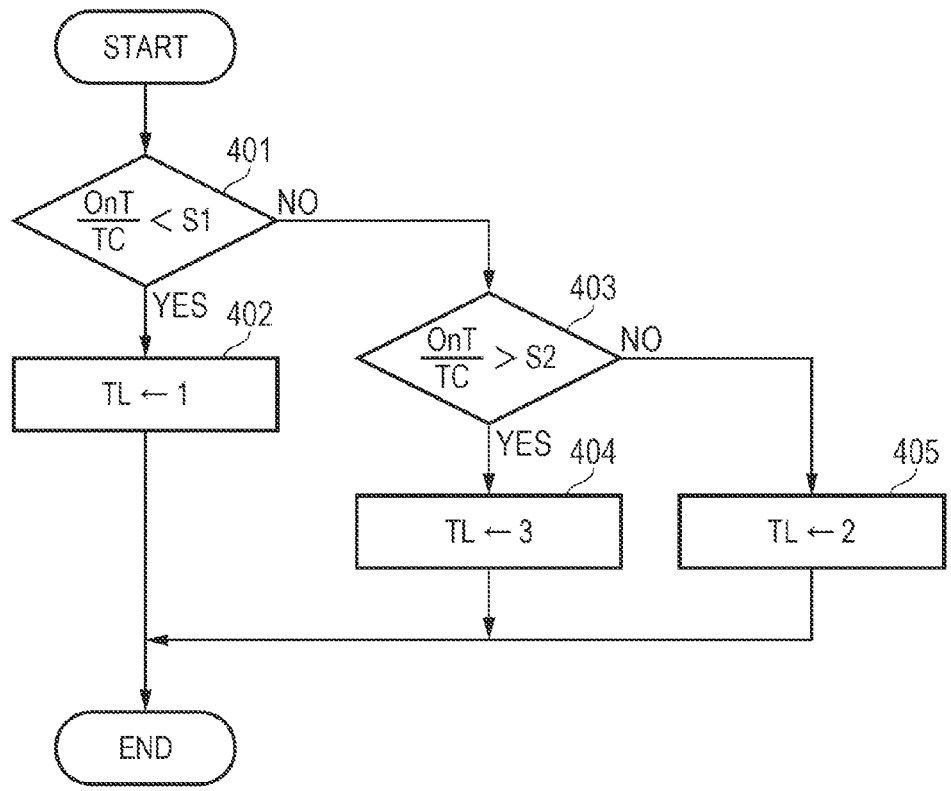
FIG. 5 shows an exemplary flowchart of level value calculation processing in the first embodiment and the second embodiment.

FIG. 2 shows a main routine 100 of processing in this embodiment. The main routine 100 is a part of a control program for the arithmetic processing unit 3 and is executed by the processing control unit 7. FIG. 4 shows input signal processing 300. The input signal processing 300 refers to a part of processing executed by the input signal processing unit 5. FIG. 5 shows level value calculation processing 400. The level value calculation processing 400 refers to a part of processing executed by the level value calculation unit 6. The main routine 100, the input signal processing 300 and the level value calculation processing 400 can be operated in parallel (executed simultaneously). The input signal processing 300 and the level value calculation processing 400 may be configured by software or by hardware.

First, the operation of the motion state detecting apparatus 10 will be described with reference to FIG. 2, FIG. 4 and FIG. 5.

After power is turned on in the motion state detecting apparatus 10, power-on resetting of the detection unit 2, the arithmetic processing unit 3 and the output unit 4 is executed and the main routine 100 starts. As the main routine 100 starts, initial setting of registers, operation modes and the like that are necessary for the operation of the detection unit 2 and the arithmetic processing unit 3 is carried out (FIG. 2, processing 101). Although not described in the processing 101, if the data output format or the like corresponding to the output destination needs to be set, the setting for the output unit 4 is also carried out in the processing 101. If there is a host apparatus for the motion state detecting apparatus 10, though not shown, an input unit for control from the host apparatus maybe provided. The host apparatus may detects the end of the power-on resetting of the motion state detecting apparatus 10 and then start the main routine 100 via the input unit. Moreover, the host apparatus itself may have a mechanism to execute the processing 101 via the input unit. The interrupt signal to the arithmetic processing unit 3 is masked in the power-on resetting. In this embodiment, the masking of the interrupt signal may be referred to as interrupt mask-on, and the cancelation of the masking of the interrupt signal may be referred to as interrupt mask-off. The interrupt signal is valid in the interrupt mask-off state.

As the initial setting of each unit is finished, the processing control unit 7 instructs the detection unit 2 to start outputting a detection signal (FIG. 2, processing 102). In this embodiment, the instruction to the detection unit 2 to output a detection signal is given only once, and after that, the detection signal continues to be outputted to the arithmetic processing unit 3. This is to simplify the description of necessary operations. However, if there is limitation on applications such as using the apparatus only within a predetermined period, it is possible to stop the operation except the operation of some circuits necessary for time monitoring of the sensor unit 1, the detection unit 2, the output unit 4 and the arithmetic processing unit 3 during the time period when the apparatus is not used. In the processing 102 of FIG. 2, the detection unit 2 starts outputting the detection signal. However, since the interrupt signal to the arithmetic processing unit 3 is masked, the processing by the arithmetic processing unit 3 to a change in the detection signal from the detection unit 2 is not carried out yet.

Next, operation parameters are set by the processing control unit 7 (FIG. 2, processing 103). In the processing 103 of FIG. 2, parameters used for the description of this embodiment are described. The described parameters are TC (the time elapsed within the unit time), TS (the length of the unit time), UC (the number of times of change from OFF to ON), DC (the number of times of change from ON to OFF), OnT (the cumulative sum of time when the sensor unit 1 is ON within the unit time), and OfT (the time elapsed within the unit time when the sensor unit 1 changes from OFF to ON). After setting the operation parameters, the processing control unit 7 cancels the interrupt mask (interrupt mask-off) (FIG. 2, processing 104), and starts counting TC (the time elapsed within the unit time) to measure the length of the time elapsed within the unit time (FIG. 2, processing 105). In response to the interrupt mask-off (FIG. 2, processing 104), the input signal processing unit 5 starts operation corresponding to the detection signal from the detection unit 2.

FIG. 4 shows a flowchart of the input signal processing 300 as a part of the processing by the input signal processing unit 5. It is determined whether a signal detected by interrupt signal detection (FIG. 4, processing 301) indicates that the sensor unit 1 is changed from ON to OFF (FIG. 4, processing 302). If the result is YES, 1 is added to DC (the number of times of change from ON to OFF) (FIG. 4, processing 303). The time during which the conducting state is provided is cumulatively added to OnT (the cumulative sum of time when the sensor unit 1 is ON within the unit time) (FIG. 4, processing 304). Then, the processing shifts to an interrupt signal detection waiting state.

If the result of the determination is NO in the processing 302 of FIG. 4, it is determined whether the detected signal indicates that the sensor unit 1 is changed from OFF to ON (FIG. 4, processing 305). If the result is YES, 1 is added to UC (the number of times of change from OFF to ON) (FIG. 4, processing 306). The value of TC (the time elapsed within the unit time) is saved as OfT (the time elapsed within the unit time when the sensor unit 1 changes from OFF to ON) (FIG. 4, processing 307). Then, the processing shifts to the interrupt signal detection waiting state. If the result is NO in the processing 305 of FIG. 4, the interrupt signal is regarded as other than the detection signal and the processing shifts to the interrupt signal detection waiting state.

After the processing 104 of FIG. 2 is executed, the main routine 100 and the input signal processing 300 operates in parallel. Although the storage section of the parameters is not particularly shown in FIG. 1, the main routine 100 and the input signal processing 300 can operate in parallel by having a register or memory in the processing control unit 7 that is accessible from the input signal processing unit 5. Alternatively, a shared memory unit that can be used by the input signal processing unit 5, the level value calculation unit 6, the processing control unit 7 and the like may be provided as a new component in the arithmetic processing unit 3, and necessary information may be saved in the shared memory unit.

After starting to measure the unit time, the processing control unit 7 monitors whether TC (the time elapsed within the unit time) does not exceed TS (the length of the unit time) (FIG. 2, processing 106). If it is determined that TC (the time elapsed within the unit time) has a length equal to or longer than TS (the length of the unit time), the masking of the interrupt signal is turned on, and UC (the number of times of change from OFF to ON) and DC (the number of times of change from ON to OFF) within the unit time and OnT (the cumulative sum of time when the sensor unit 1 is ON within the unit time) are finalized (FIG. 2, processing 109). After that, the level value calculation processing 400 shown in FIG. 5 is started (FIG. 2, processing 110). Although not shown in FIG. 2, it is preferable that a first boundary condition S2 and a second boundary condition S1 having a smaller value than S2 that are used in the level value calculation processing 400 are decided as predetermined values in advance through experiments or the like and are set before the level value calculation processing 400 is started. For example, these conditions S1 and S2 may be set in the processing 101 of FIG. 2. Alternatively, if S1 and S2 are not set within the main routine 100, S1 and S2 maybe set before processing 401 of the level value calculation processing 400.

After that, the processing control unit 7 outputs the result of the calculation in the level value calculation processing 400 (FIG. 2, processing 111) and then confirms whether an instruction to end the motion state detection processing is given, for example, by the host apparatus (FIG. 2, processing 112). If there is no instruction to end, the processing returns to the setting of operation parameters for the measurement of next unit time (FIG. 2, processing 103). In this processing, it is a common measure to prepare two sets of the above parameters and alternately use the two sets to enable execution of the processing 103 of FIG. 2 irrespective of the progress of the level value calculation processing 400. However, in this case, for example, the processing to be carried out in the processing 111 of FIG. 2 must be carried out in the level value calculation processing 400.

If TC (the time elapsed within the unit time) does not exceed TS (the length of the unit time) in the processing 106 of FIG. 2, the processing control unit 7 compares UC (the number of times of change from OFF to ON) with the determination standard S0 (FIG. 2, processing 107). If UC (the number of times of change from OFF to ON) exceeds S0, the processing control unit 7 sets TS (the length of the unit time) which decides the unit time interval to t1 (FIG. 2, processing 108) and returns to the processing 106.

Next, the level value calculation processing 400 shown in FIG. 5 will be described. The level value calculation processing 400 is started by the processing control unit 7 in the main routine 100 (FIG. 2, processing 110). The level value calculation processing 400 is the processing to decide which level of the plural level values is implemented in accordance with the range which the proportion of OnT (the cumulative sum of time when the sensor unit 1 is ON within the unit time) in the unit time calculated by the processing control unit 7 falls in. The level value TL is decided based on the first boundary condition S2 and the second boundary condition S1 (FIG. 5, processing 401, and FIG. 5, processing 403). If OnT (the cumulative sum of time when the sensor unit 1 is ON within the unit time)/TC (the time elapsed within the unit time)<S1 holds, level 1 (TL=1) is implemented (FIG. 5, processing 402). If OnT (the cumulative sum of time when the sensor unit 1 is ON within the unit time)/TC (the time elapsed within the unit time)>S2 holds, level 3 (TL=3) is implemented (FIG. 5, processing 404). If S1 OnT (the cumulative sum of time when the sensor unit 1 is ON within the unit time)/TC (the time elapsed within the unit time)≤S2 holds, level 2 (TL=2) is implemented (FIG. 5, processing 405).

In the level value calculation processing 400, TC (the time elapsed within the unit time) is used to calculate the proportion of OnT (the cumulative sum of time when the sensor unit 1 is ON within the unit time) in the unit time. However, in this embodiment, TS (the length of the unit time) may be used instead of TC (the time elapsed within the unit time). The number of levels stored as TL and the determinations standards such as S0, S1 and S2 may vary depending on the measuring target. Therefore, it is preferable to set an appropriate number of levels and determination standards based on experiments or the like.

The processing flow and the configuration of the apparatus according to the embodiment are described above. Next, an example of measurement using the apparatus of the embodiment will be described.

EXAMPLE 1

This example relates to a case where the sensor unit 1 is attached to a person so that the sensor unit 1 is ON when the person is in an upright state, and the person shifts from an upright walking state to a fallen state. In this example, if the time when the person is in the upright state occupies a large proportion of the unit time, level 3 is implemented. If the time when the person is in the fallen state (the non-upright state) occupies a large proportion of the unit time, level 1 is implemented.

FIG. 6A is a chart showing the state of the sensor unit 1 detected by the input signal processing unit 5 in this example. FIG. 6A shows the time when the sensor unit 1 is ON by rectangles. In FIG. 6A to FIG. 6C, the range of the unit time having a predetermined time interval is indicated by t0. The boundaries between plural continuous unit times are indicated by (1) to (9). In the description of this example, for example, the description {unit time (1)-(2)} indicates the unit time having a range prescribed by the unit time boundaries (1) and (2).

Also, to facilitate visual and logical interpretation, the charts shown in FIG. 6A to FIG. 6C, FIG. 7A to FIG. 7C, and FIG. 8A to FIG. 8C used for the description of the subsequent examples including this example are deformed. As the parameter values, values adjusted according to this deformation are described as preset values. Thus, S0, S1 and S2 are set as S0=15, S1=0.25 and S2=0.75. Moreover, t1=t0×1.5 is set.

FIG. 6B shows the result of output (level value) from motion state detecting apparatus 10 where the length of the unit time is always t0, that is, where the length of the unit time is not changed in the chart of FIG. 6A. FIG. 6C shows the result of output (level value) from the motion state detecting apparatus 10 where the predetermined time interval which decides the unit time is changed from t0 to t1 during the measurement of {unit time (3)-(4)} and {unit time (3)-(4)} is replaced by {unit time (3)-(7)}, that is, where the length of the unit time is changed.

FIG. 6A shows a case where the person with the sensor unit 1 attached thereto is moving with a substantially constant rhythm but suddenly falls and then stays fallen. Based on the ON-OFF state of the sensor unit 1 in the former half of {unit time (1)-(2)}, it can be supposed that the person is moving with a substantially constant rhythm. Since the ON state of the sensor unit 1 continues from the end of {unit time (1)-(2)} to {unit time (2)-(3)}, it can be understood that during this period, the spherical conductor in the sensor unit 1 is in contact with the pair of electrodes so that the sensor unit 1 is ON. This state indicates that during this period, the person with the sensor unit 1 attached thereto may be substantially standing still in the upright state. After that, during {unit time (3)-(4)}, the number of times of ON-OFF change in the sensor unit 1 shows increase as measured. As time proceeds to {unit time (4)-(5)} and {unit time (5)-(6)}, the number of times of ON-OFF change in the sensor unit 1 shows gradual decrease and the OFF time of the sensor unit 1 shows increase, as measured. This state indicates that during {unit time (4)-(5)} and {unit time (5)-(6)}, the person with the sensor unit 1 attached thereto may be in the non-upright state, that is, in the fallen state.

The increase in the number of times of ON-OFF change in the sensor unit 1 is a phenomenon that occurs when the person with the sensor unit 1 attached thereto shifts from a moving state to a stop state. Since the number of times of ON-OFF change in the sensor unit 1 increases during {unit time (3)-(4)}, the ON state of the sensor unit 1 that continues from the end of {unit time (1)-(2)} to {unit time (2)-(3)} can be determined as due to the fact that the person with the sensor unit 1 attached thereto is making a movement of falling, instead of the fact that the person with the sensor unit 1 attached thereto is standing still in the upright state. Since the person with the sensor unit 1 attached thereto is making the movement of falling, the spherical conductor is in a state similar to sticking to the pair of electrodes. Therefore, it can be considered that the person is substantially in the fallen state during {unit time (3)-(4)}.

However, though it can be determined that the person is in the fallen state during {unit time (3)-(4)}, level 2 (the proportion of the ON-time of the sensor unit 1 is 0.28) is implemented in FIG. 6B, where the unit time is not changed, and this level 2 is the same level 2 value as in {unit time (1)-(2)} (the proportion of the ON time of the sensor unit 1 is 0.41) when the person is moving with a constant rhythm. Therefore, it can be understood that if the unit time is not changed, the state of the person cannot be discriminated solely based on the level value as the output from the motion state detecting apparatus 10.

FIG. 6C shows a case where the value of TS (the length of the unit time) is changed to t1 as UC (the number of times of change from OFF to ON) exceeds S0 during {unit time (3)-(4)}. Thus, the unit time immediately after {unit time (2)-(3)} is changed from {unit time (3)-(4)} to {unit time (3)-(7)}. With this change, the level value in {unit time (3)-(7)} becomes level 1 (the proportion of the ON-time of the sensor unit 1 is 0.21), indicating that it can be supposed that the person is in the non-upright state, that is, in the fallen state. Thus, it can be understood that the level value in {unit time (3)-(7)} is a different value from the level value in {unit time (1)-(2)} and the output (level value) from the motion state detecting apparatus 10 matches the actual movement of the person. Therefore, it can be understood that it is possible to detect the motion state closer to the actual movement by changing the length of the unit time based on the number of times of ON-OFF change in the sensor unit 1.

EXAMPLE 2

This example relates to a case where the sensor unit 1 is attached to a person so that the sensor unit 1 is OFF when the person is in an upright state, and the person shifts from an upright walking state to a fallen state. In this example, if the time when the person is in the upright state occupies a large proportion of the unit time, level 1 is implemented. If the time when the person is in the fallen state occupies a large proportion of the unit time, level 3 is implemented. These states are shown in FIG. 7A to FIG. 7C by a description method similar to the description in FIG. 6A to FIG. 6C.

FIG. 7B shows the result of output (level value) from the motion state detecting apparatus 10 where the length of the unit time is always t0, that is, where the length of the unit time is not changed in the chart of FIG. 7A. FIG. 7C shows the result of output (level value) from the motion state detecting apparatus 10 where the predetermined time interval which decides the unit time is changed from t0 to t1 during the measurement of {unit time (3)-(4)}, that is, the length of the unit time is changed and {unit time (3)-(4)} is replaced by {unit time (3)-(7)}.

Similarly to FIG. 6A, FIG. 7A shows a case where the person with the sensor unit 1 attached thereto is moving with a substantially constant rhythm but suddenly falls and then stays fallen. Based on the ON-OFF state of the sensor unit 1 around immediately after the former half of {unit time (1)-(2)}, it can be supposed that the person is moving with a substantially constant rhythm. Since the OFF state of the sensor unit 1 continues from the end of {unit time (1)-(2)} to {unit time (2)-(3)}, it can be understood that the spherical conductor in the sensor unit 1 is in contact with either one of the pair of electrodes. This state indicates that during this period, the person with the sensor unit 1 attached thereto may be substantially standing still in the upright state. After that, during {unit time (3)-(4)}, the number of times of ON-OFF change in the sensor unit 1 shows increase as measured. During {unit time (4)-(5)} and {unit time (5)-(6)}, the sensor unit 1 is substantially in the ON-state. This state indicates that during {unit time (4)-(5)} and {unit time (5)-(6)}, the person with the sensor unit 1 attached thereto may be in the non-upright state, that is, in the fallen state.

As described above, the increase in the number of times of ON-OFF change in the sensor unit 1 is a phenomenon that occurs when the person with the sensor unit 1 attached thereto shifts from a moving state to a stop state. Since the number of times of ON-OFF change in the sensor unit 1 increases during {unit time (3)-(4)}, the OFF state of the sensor unit 1 that continues from the end of {unit time (1)-(2)} to {unit time (2)-(3)} can be determined as due to the fact that the person with the sensor unit 1 attached thereto is making a movement of falling, instead of the fact that the person with the sensor unit 1 attached thereto is standing still in the upright state. Therefore, it can be considered that the person is substantially in the fallen state during {unit time (3)-(4)}.

However, though it can be determined that the person is substantially in the fallen state during {unit time (3)-(4)}, level 2 (the proportion of the ON-time of the sensor unit 1 is 0.63) is implemented in FIG. 7B, where the unit time is not changed, and this level 2 is the same level 2 as in {unit time (1)-(2)} (the proportion of the ON time of the sensor unit 1 is 0.44) when the person is moving with a constant rhythm. Therefore, as in Example 1, the state of the person cannot be discriminated solely based on the level value as the output from the motion state detecting apparatus 10.

In FIG. 7C, TS (the length of the unit time) is changed to t1 as UC (the number of times of change from OFF to ON) exceeds S0 during {unit time (3)-(4)}. Thus, the unit time immediately after {unit time (2)-(3)} is changed from {unit time (3)-(4)} to {unit time (3)-(7)}. With this change, the level value in {unit time (3)-(7)} becomes level 3 (the proportion of the ON-time of the sensor unit 1 is 0.87), indicating that the person is in the fallen state. The level value in {unit time (3)-(7)} is a different value from the level value in {unit time (1)-(2)} and the output (level value) from the motion state detecting apparatus 10 matches the actual movement of the person. Therefore, it can be understood that it is possible to detect the motion state closer to the actual movement by changing the length of the unit time based on the number of times of ON-OFF change.

In the above Example 1 and Example 2, the values of S1 and S2 are not changed. However, it can be considered that if TS (the length of the unit time) is changed, changing S1 and S2 may generate a preferable result. It is preferable to decide these values serving as standards including S0, which is the other determination standard, through repeated experiments assuming the circumstances where that the motion state detecting apparatus 10 is used.

Second Embodiment

Figure 3:
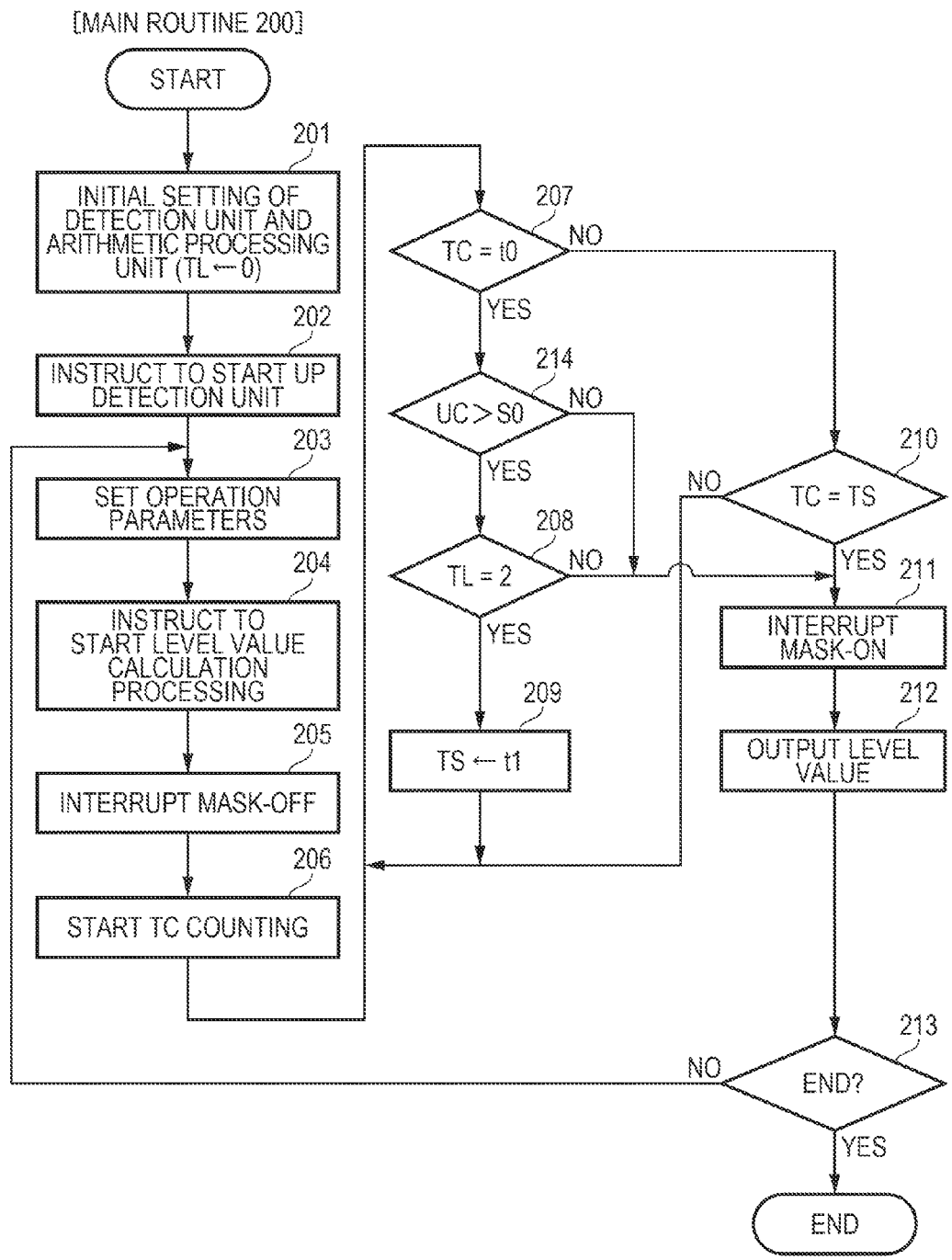
FIG. 3 shows an exemplary main flowchart according to the second embodiment.

In this embodiment, the motion state of the sensor unit 1 determined based on an output signal from the sensor unit 1 is corrected by changing the length of the unit time, and the number of times of change from OFF to ON in the sensor unit 1 and the level value at the time point when the lapse of the predetermined unit time is complete are used to determine whether to change the length of the unit time or not. FIG. 3 shows the flowchart of a control program (main routine 200) executed by the processing control unit 7 in this embodiment. The parameters used in this embodiment are the same as the parameters used in the first embodiment. Also, the input signal processing 300 and the level value calculation processing 400 are the same as in the first embodiment. However, while TS (the length of the unit time) can be used instead of TC (the time elapsed within the unit time) in the level value calculation processing 400 in the first embodiment, TS (the length of the unit time) cannot be used in this embodiment.

First, the main routine 200 will be described. After power is turned on in the motion state detecting apparatus 10, power-on resetting of the detection unit 2, the arithmetic processing unit 3 and the output unit 4 is executed and the main routine 200 starts in the processing control unit 7. Processing 201 of FIG. 3 to carry out initial setting is the same as the processing 101 of FIG. 2 of the main routine 100 described in the first embodiment. Thus, initial setting of registers and the like necessary for the operation of the detection unit 2 and the arithmetic processing unit 3 is carried out. Although the basic processing is the same as the processing 101 of FIG. 2, level values are used in the main routine 200 and therefore an initial value of the a variable TL to store the level values needs to be set. The initial value of TL may be any value that is not included in the set level values. In this embodiment, TL=0 is used. The masked state of the interrupt signal to the arithmetic processing unit 3 (interrupt mask-on) by the power-on resetting or the processing 201 is the same as in the main routine 100. Moreover, though not shown in FIG. 3, modifications of the embodiment in the case where setting for the output unit 4 is necessary and in the case where there is a host apparatus are the same as in the first embodiment.

As the initial setting of each unit is finished, the processing control unit 7 instructs the detection unit 2 to start outputting a detection signal (FIG. 3, processing 202). In this embodiment, too, the instruction to the detection unit 2 to output a detection signal is given only once. After that, the detection signal continues to be outputted to the arithmetic processing unit 3, as in the first embodiment. Although the detection unit 2 starts outputting the detection signal by the processing 202 of FIG. 3, the interrupt signal to the arithmetic processing unit 3 is masked and therefore processing for change of the detection signal from the detection unit 2 is not carried out yet.

Next, operation parameters are set by the processing control unit 7 (FIG. 3, processing 203). In FIG. 3, the parameters used are the same as in the first embodiment and therefore the description of these parameters is omitted. After setting the operation parameters, the processing control unit 7 gives an instruction to start the level value calculation processing 400 (FIG. 3, processing 204). The values of S1 and S2 may be set before the processing 401 of the level value calculation processing 400. After that, the processing control unit 7 cancels the interrupt mask (interrupt mask-off) (FIG. 3, processing 205) and starts the counting of TC (the time elapsed within the unit time) to measure the lapse of the unit time (FIG. 3, processing 206).

In this embodiment, the main routine 200, the input signal processing 300 and the level value calculation processing 400 operate in parallel. A shared memory or shared register to store various parameters is necessary as in the first embodiment.

In response to the interrupt mask-off (FIG. 3, processing 205), the input signal processing unit 5 starts carrying operation (FIG. 4, input signal processing 300) corresponding to the detection signal from the detection unit 2.

Processing 207 of FIG. 3 is the processing to determine that TC (the time elapsed within the unit time) reaches t0, which is a predetermined time as the unit time. The processing control unit 7 determines whether UC (the number of times of change from OFF to ON) in the sensor unit 1 exceeds S0 or not at the time point when the processing times reaches t0 (FIG. 3, processing 214). If UC (the number of times of change from OFF to ON) exceeds S0, the processing control unit 7 determines whether the level value is level 2 (TL=2) that is the intermediate level (FIG. 3, processing 208). If the level value is the intermediate level, the length of the unit time is changed (FIG. 3, processing 209) and the processing shifts to processing 207 of FIG. 3. If the level value is not the intermediate level, the length of the unit time is not changed and the processing control unit 7 performs interrupt mask-on operation and finalizes OnT (the cumulative sum of time when the sensor unit 1 is ON within the unit time) (FIG. 3, processing 211). Then, the level value is outputted (FIG. 3, processing 212).

If the length of the unit time is changed, whether TC (the time elapsed within the unit time) reaches TS (the length of the unit time) or not is monitored in processing 210 of FIG. 3. If it is determined that TC (the time elapsed within the unit time) reaches TS (the length of the unit time), the mask of the interrupt signal is turned on and OnT (the cumulative sum of time when the sensor unit 1 is ON within the unit time) is finalized (FIG. 3, processing 211). Then, the level value is outputted (FIG. 3, processing 212). As described above, if the length of the unit time is not changed, whether TC (the time elapsed within the unit time) reaches TS (the length of the unit time) is determined in the processing 207 of FIG. 3. In this case, TC (the time elapsed within the unit time) is always smaller than TS (the length of the unit time) in the processing 210 of FIG. 3, and no shift is made from the processing 210 of FIG. 3 to the processing 211 of FIG. 3. Therefore, in the processing 210 of FIG. 3, t1 as the length of the unit time after change may be used instead of TS (the length of the unit time). However, TS (the length of the unit time) cannot be used instead of t0 in the processing 207 of FIG. 3. This is because after the length of the unit time is changed, if the motion state is at level 2 when TC (the time elapsed within the unit time) reaches TS (the length of the unit time), the processing 207 of FIG. 3 and the processing 210 of FIG. 3 are simply repeated after that, without proceeding to the processing 211 of FIG. 3.

After the processing 212 of FIG. 3, the processing control unit 7 confirms whether the end of the motion state detection processing is instructed, for example, by the host apparatus or the like (FIG. 3, processing 213). If there is no instruction to end, the processing control unit 7 returns to the processing to set the operation parameters for the measurement of next unit time (FIG. 3, processing 203). As described above, the processing 207 of FIG. 3 and the processing 210 of FIG. 3 are for determining the lapse of the unit time. If TC (the time elapsed within the unit time) is not equal to the set length of the unit time, the loop formed by the professing 207 of FIG. 3 and the processing 210 of FIG. 3 is repeated.

EXAMPLE 3

This example relates to a case where the sensor unit 1 is attached to a person so that the sensor unit 1 is ON when the person is in an upright state, and the person shifts from an upright walking state to a fallen state. The way of falling is more violent than in Example 1. In this example, as in Example 1, if the time when the person is in the upright state occupies a large proportion of the unit time, level 3 is implemented. If the time when the person is in the fallen state occupies a large proportion of the unit time, level 1 is implemented.

Figure 8A:
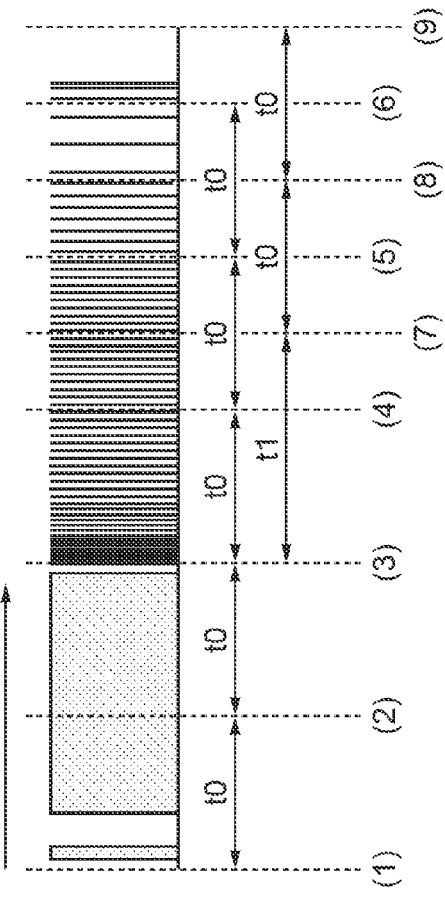
FIG. 8A to FIG. 8C show changes in level value in Example 3.

This example of the embodiment will be described with reference to FIG. 8A to FIG. 8C. FIG. 8A is a chart showing the time intervals when the sensor unit 1 is ON by rectangles, as in FIG. 6A and FIG. 7A. The set values of S0, S1 and S2 (S0=15, S1=0.25 and S2=0.75) are the same as in Example 1 and Example 2. Moreover, t1=t0×1.5 is the same as in Example 1 and Example 2.

Figure 8B:
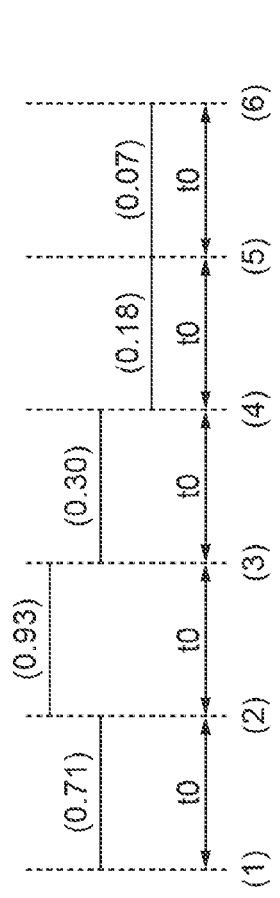
Figure 8C:
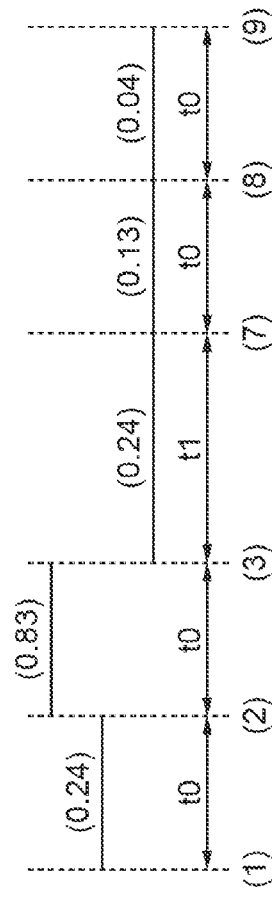

As can be seen from FIG. 8A to FIG. 8C, during {unit time (1)-(2)} and {unit time (2)-(3) }, UC (the number of times of change from OFF to ON) does not reach S0 at the time point when the lapse of t0 as the unit time is complete. However, during {unit time (3)-(4)}, UC (the number of times of change from OFF to ON) of the sensor unit 1 exceeds S0 at the time point when the lapse of t0 is complete. Therefore, the level value at the time point when the lapse of t0 is complete is compared with S1 and S2.

As shown in FIG. 8B, since the level value in {unit time (3)-(4)} is level 2 (the proportion of the ON time of the sensor unit 1 is 0.30), the length of the unit time is changed and {unit time (3)-(4)} is replaced by {unit time (3)-(7)}. The length of the unit time is changed and the level in {unit time (3)-(7)} is corrected to level 1 (the proportion of the ON time of the sensor unit 1 is 0.24), as shown in FIG. 8C.

The length of the unit time of {unit time (7)-(8) }, which is next to {unit time (3)-(7)}, is returned to t0 by the processing 203 of FIG. 3. In {unit time (7)-(8)}, the value of UC (the number of times of change from OFF to ON) after the lapse of t0 exceeds S0, but the level value is level 1 (the proportion of the ON time of the sensor unit 1 is 0.13). Therefore, the measurement of {unit time (8)-(9)} is started without changing the length of the unit time.

Generally, the more violent the movement of the sensor unit 1 is, the greater the number of oscillations of the spherical conductor in the sensor unit 1 is after the movement of the sensor unit 1 is stopped. However, the number of oscillations does not increase infinitely but has an upper limit value that is decided by the internal shape of the sensor unit 1 and the size and mass of the spherical conductor. After the upper limit value is reached, the increase appears in the form of extended oscillation time of the spherical conductor. Therefore, the more violent the movement of the sensor unit 1 is, the longer it takes for the spherical conductor to stop moving. The discrepancy between the movement of the sensor unit 1 and the signal detected from the sensor unit 1 tends to increase. However, as described in the embodiments as examples, by applying the invention, it is possible to correct the discrepancy between the movement of the sensor unit 1 and the signal detected from the sensor unit 1. Thus, the motion state closer to the actual movement can be detected.

As described above, by applying the invention, it is possible to use a motion state detection sensor instead of an acceleration sensor or an angular velocity sensor and to provide a motion state detecting apparatus which is less expensive and consumes less power than an apparatus using an acceleration sensor or an angular velocity sensor.

The entire disclosure of Japanese Patent Application No. 2010-026257, filed Feb. 9, 2010 is expressly incorporated by reference herein.

What is claimed is:

1. A motion state detecting method using a detector which detects one of a conducting state and a non-conducting state according to a movement of an object, the method comprising:

first processing, using the detector to measure either a first number of state changes that is the number of times of change from the conducting state to the non-conducting state per unit measurement time interval or a second number of state changes that is the number of times of change from the non-conducting state to the conducting state per the unit measurement time interval; and second processing, using the detector to regard either the first number of state changes or the second number of state changes as a change determination value, and to adjust the duration of the unit measurement time interval based on the change determination value;

wherein a proportion of time of the conducting state per the adjusted unit measurement time interval or a proportion of time of the non-conducting state per the adjusted unit measurement time interval represents the motion state being detected.

2. The motion state detecting method according to claim 1, wherein in the second processing, the change determination value is compared with a first reference value, and if the change determination value exceeds the first reference value, the duration of the unit measurement time interval is increased.

3. The motion state detecting method according to claim 1, wherein the second processing is carried out if the proportion of the time of the conducting state per the unit measurement time interval is smaller than a first boundary condition value and greater than a second boundary condition value that is smaller than the first boundary condition value.

4. A motion state detecting apparatus comprising:
a first electrode;
a second electrode arranged facing the first electrode;
a conductor which exists between the first electrode and the second electrode and causes the first electrode and the second electrode to enter either a conducting state or a non-conducting state; and
an arithmetic processing unit;
wherein the arithmetic processing unit calculates either a first number of state changes that is the number of times of change from the conducting state to the non-conducting state per unit measurement time interval or a second number of state changes that is the number of times of change from the non-conducting state to the conducting state per the unit measurement time interval, as a change determination value, adjusts a duration of the unit measurement time interval based on the change determination value, and determines a motion state using a proportion of time of the conducting state per the adjusted unit measurement time interval or a proportion of time of the non-conducting state per the adjusted unit measurement time interval.

\* \* \* \* \*